US008170873B1

(12) United States Patent  
Morris

(10) Patent No.: US 8,170,873 B1  
(45) Date of Patent: May 1, 2012

(54) COMPARING EVENTS IN WORD SPOTTING

(75) Inventor: Robert W. Morris, Atlanta, GA (US)

(73) Assignee: Nexidia Inc., Atlanta, GA (US)

( * ) Notice: Subject to any disclaimer, the term of this patent is extended or adjusted under 35 U.S.C. 154(b) by 2367 days.

(21) Appl. No.: 10/897,056

(22) Filed: Jul. 22, 2004

Related U.S. Application Data

(60) Provisional application No. 60/489,391, filed on Jul. 23, 2003.

(51) Int. Cl.
- *G10L 15/10* (2006.01)
- *G10L 15/06* (2006.01)
- *G10L 15/12* (2006.01)
- *G10L 15/14* (2006.01)
- *G10L 15/00* (2006.01)
- *G10L 15/04* (2006.01)

(52) U.S. Cl. .................. 704/240; 704/238; 704/256.5

(58) Field of Classification Search .......... 704/231–257, 704/E17.001–E17.016, E15.001–E15.05, 704/E21.001–E21.013; 455/414.1–414.4
See application file for complete search history.

(56) References Cited

U.S. PATENT DOCUMENTS

| | | | | | |
|---|---|---|---|---|---|
| 4,803,729 | A | * | 2/1989 | Baker ........................... | 704/241 |
| 4,829,578 | A | * | 5/1989 | Roberts ........................ | 704/233 |
| 4,937,870 | A | * | 6/1990 | Bossemeyer, Jr. ............ | 704/241 |
| 4,977,599 | A | * | 12/1990 | Bahl et al. ................... | 704/256.4 |
| 5,073,939 | A | * | 12/1991 | Vensko et al. ................ | 704/241 |
| 5,220,609 | A | * | 6/1993 | Watanabe et al. ............. | 704/252 |
| 5,333,275 | A | * | 7/1994 | Wheatley et al. ............. | 704/243 |
| 5,613,037 | A | * | 3/1997 | Sukkar ......................... | 704/256 |
| 5,625,748 | A | * | 4/1997 | McDonough et al. ........ | 704/251 |
| 5,675,706 | A | * | 10/1997 | Lee et al. ..................... | 704/256 |
| 5,748,840 | A | * | 5/1998 | La Rue ......................... | 704/254 |
| 5,787,393 | A | * | 7/1998 | Inazumi ....................... | 704/232 |
| 5,819,223 | A | * | 10/1998 | Takagi ......................... | 704/256.1 |
| 5,950,159 | A | * | 9/1999 | Knill ............................ | 704/251 |
| 6,061,652 | A | * | 5/2000 | Tsuboka et al. .............. | 704/245 |
| 6,073,095 | A | * | 6/2000 | Dharanipragada et al. ... | 704/242 |
| 6,076,053 | A | * | 6/2000 | Juang et al. .................. | 704/236 |
| 6,078,885 | A | * | 6/2000 | Beutnagel .................... | 704/258 |
| 6,272,463 | B1 | * | 8/2001 | Lapere ......................... | 704/248 |
| 6,389,389 | B1 | * | 5/2002 | Meunier et al. .............. | 704/222 |
| 6,757,652 | B1 | * | 6/2004 | Lund et al. ................... | 704/254 |
| 7,231,351 | B1 | * | 6/2007 | Griggs ......................... | 704/251 |
| 2001/0018654 | A1 | * | 8/2001 | Hon et al. .................... | 704/257 |
| 2003/0055640 | A1 | * | 3/2003 | Burshtein et al. ............ | 704/235 |
| 2004/0148163 | A1 | * | 7/2004 | Baker ........................... | 704/231 |

FOREIGN PATENT DOCUMENTS

WO     WO 87/04836    *   8/1987

* cited by examiner

*Primary Examiner* — David R Hudspeth  
*Assistant Examiner* — David Kovacek  
(74) *Attorney, Agent, or Firm* — Occhiuti Rohlicek & Tsao LLP

(57) ABSTRACT

An approach to comparing events in word spotting, such as comparing putative and reference instances of a keyword, makes use of a set of models of subword units. For each of two acoustic events and for each of a series of times in each of the events, a probability associated with each of the models of the set of subword units is computed. Then, a quantity characterizing a comparison of the two acoustic events, one occurring in each of the two acoustic signals, is computed using the computed probabilities associated with each of the models.

14 Claims, 2 Drawing Sheets

COMPARING EVENTS IN WORD SPOTTING

CROSS-REFERENCE TO RELATED APPLICATIONS

This application claims the benefit of U.S. Provisional Application No. 60/489,391 filed Jul. 23, 2003, which is incorporated herein by reference.

BACKGROUND

This invention relates to comparison of acoustic events, and in particular to comparison of linguistic events in a word spotting system.

Determining the similarity of acoustic events, which may be instances of utterances of a same word or phrase, is useful in various aspects of speech recognition. One such aspect is for rescoring, or secondary scoring, of putative instances of words or phrases located using a word spotting system. In such a system, a variety of approaches have been suggested for comparing the acoustic information from a putative instance of the word or phase with a reference instance of that word or phrase.

SUMMARY

In one aspect, in general, the invention features a method and associated software and computer system that makes use of models for a set of subword units. For each of two acoustic events and for each of a series of times in each of the events, a probability associated with each of the models of the set of subword units is computed. Then, a quantity characterizing a comparison of the two acoustic events, one occurring in each of the two acoustic signals, is computed using the computed probabilities associated with each of the models.

Aspects of the invention can include one or more of the following features:

The two acoustic events include a reference instance of a query and a putative instance of a query identified using a word spotting approach. For example, the reference instance of the query may have been spoken by a user wishing to locate instances of the query. The two acoustic events can alternatively include two putative instances of a query identified using a word spotting approach Each of the models of the set of subword units can characterize a time variation of instances of the unit, for example, using a Hidden Markov Model (HMM) with one or more states for each unit.

Computing the probability associated with each of the models can include computing a probability distribution over the set of subword units, and can include computing a probability distribution over the individual states of the subword units.

Computing the probability distribution over the set of subword units can include computing a probability associated with each of the set of subword units based a time evolution of the acoustic signal over an interval including multiple subword units. For example, a Forward algorithm and/or a Backward HMM algorithm, or a Viterbi algorithm, can be used to compute the state probabilities.

Computing the quantity characterizing the comparison of the two acoustic events can include comparing pairs of the probability distributions, one each of each pair associated with each of the two acoustic signals. One way of comparing the pairs of the probability distributions includes computing a Kullback-Leibler distance between the distributions.

Computing the quantity characterizing the comparison of the two acoustic events can include time aligning the two acoustic events, for example, by optimizing a time alignment based on an optimization of the quantity characterizing the comparison. One way to implement the optimization is to apply a dynamic programming, or dynamic time warping (DTW), approach.

Aspects of the invention can include one or more of the following advantages:

Using the probabilities associated with the subword units can improve the accuracy of a comparison of the acoustic events. Increased accuracy can be used to reduce the number of false alarms or to increase the detection rate of a word spotter.

Other features and advantages of the invention are apparent from the following description, and from the claims.

DESCRIPTION

Figure 1:
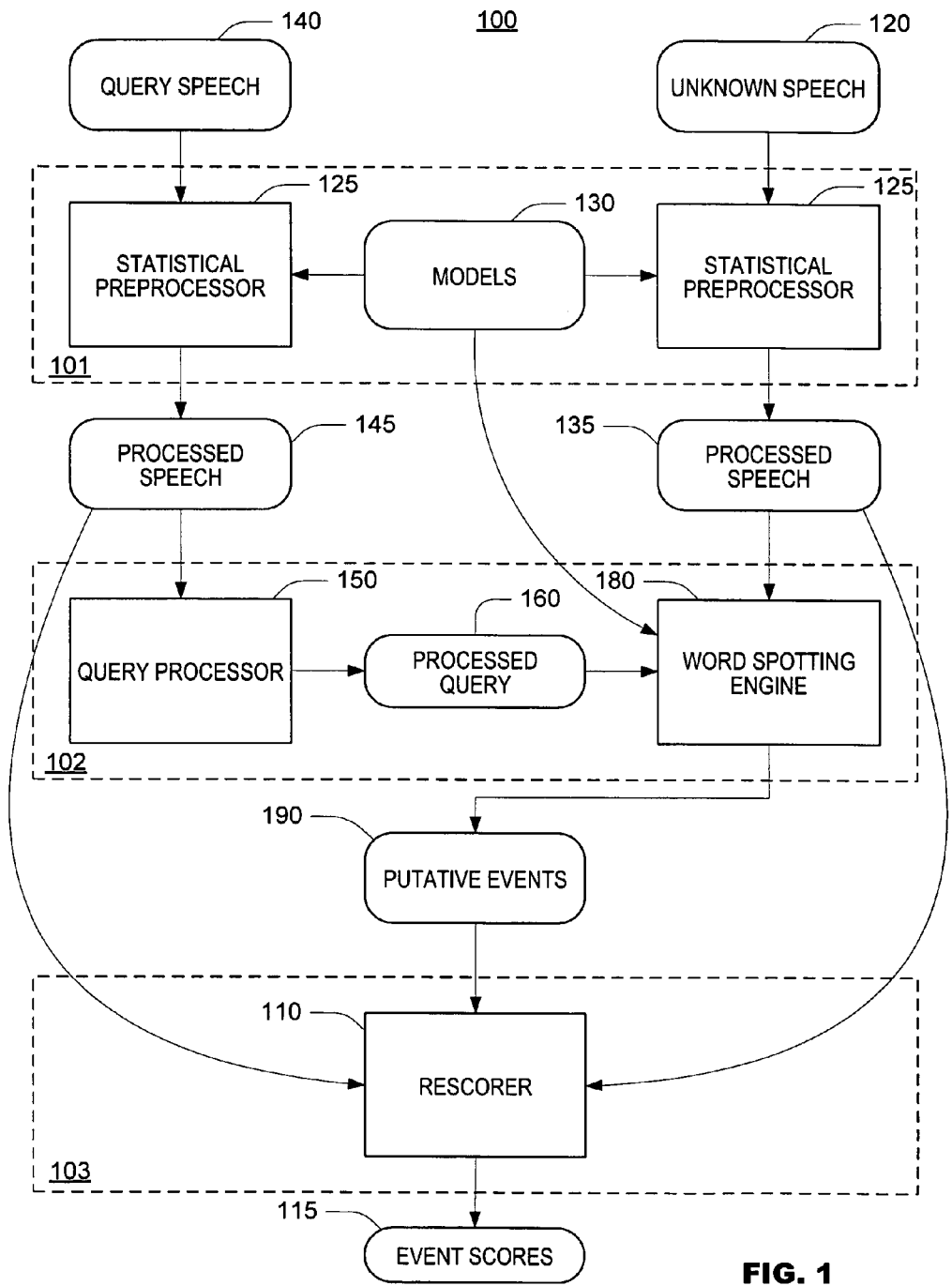
FIG. 1 is a block diagram of a word spotting system with a rescorer.

Referring to FIG. 1, a word spotting system 100 makes use of a series of three processing stages 101-103. The first two stages 101 and 102 together accept unknown speech 120 as well as query speech 140, which provides examples of one or more linguistic events (e.g., words or phrases) that are to be located in the unknown speech, and produce putative events 190, which identifies locations in the unknown speech 120 at which the events may be located. Because of the imperfect nature of word spotting, not all the putative events correspond to detections of true events. Putative events are often referred to as "hits" and "misses" (or "false alarms") according to whether they correspond to detections of true events. Putative events 190 optionally includes a score associated with each located event and this score provides a way of selecting events that tend to be hits rather than misses.

The word spotting system 100 makes use of a rescoring phase 103, which is used to calculate scores for the putative events. These scores are separate from the optional scores produced by the second phase 102 of the word spotting system. The scores calculated in the rescoring phase provide a way of selecting or sorting the putative events so that events that are more likely to be hits have better (in this version of the system, smaller) scores.

In the first stage 101, a statistical preprocessor 125 takes as input each of the query speech 140 and the unknown speech 120 and produces processed speech 145 and processed speech 135, respectively. The statistical preprocessor 125 makes use of models 130, which includes statistically-derived parameters for a set of subword models. In this system, the subword models include Hidden Markov Models (HMMs) for a set of English-language phonemes. Each phoneme is represented by a network of model states that are interconnected by possible transitions. One example of such networks are three-state "left-to-right" models in which each state is associated with a probability distribution for features (e.g., spectral band energies, cepstra, etc.) determined from signal processing the query speech and the unknown speech.

The output of the first phase, processed speech 145 and 135, includes for each of a series of times in the query and unknown speech (e.g., once every 15 millisecond "frame") a probability distribution over the states of all the models of the subword models of models 130. That is, if there are 40 subword models with 3 states each, then at each time there are 120 probabilities that add up to one. There are a number of different ways of computing these probabilities. One way to compute these probabilities is to assume that the subword models can follow one another in any order and the probability of occupying each state is computed conditionally on the entire input (both before and after the time in question). Such a computation can be calculated efficiently using the Forward-Backward algorithm. Alternatively, the probabilities of occupying each of the states can be conditioned on less that the full input, for instant, conditioned on inputs up to the time in question, on inputs after the time in question, or on inputs at or in the vicinity of the time in question, and other equivalent quantities such as the probabilities of the inputs conditioned on being at a particular state at a particular time can be used. In alternative versions of the system, other algorithms can be used to compute the probability distributions, such as the Viterbi algorithm. Also, the assumptions regarding the statistics of the sequences of subword models can be chosen to be more complex, for example, forming a Markov chain.

In the second phase 102, a query processor 150 forms a processed query 160 from the processed speech 145, which was computed from the query speech 140. The processed query 160 includes data that characterizes possible sequences of subword models, optionally characterizing relative probabilities of the possible sequences, that represent the query events. In a simple version of the system, a processed query 160 includes data that identifies a single sequence of subword units, which in the case of phonetic subword units corresponds to a phonetic "spelling" of the word or phrase of the query.

A word spotting engine 180 scans through the processed speech 135 and detects possible occurrences of the query based on the processed query 160, as well as on the models 130. That is, processed query 160 together with models 130 characterize the query in terms of the features modeled in the subword models of models 130. The putative events 190 include, for each possible occurrence of a query event, an estimate of the starting and the ending time for the event. These starting and ending times correspond to particular times, and their associated probability distributions, in processed speech 135. The word spotting engine 180 computes a probability that a query starts at a each time conditioned on all the computed features of the unknown speech 120, using a variant of the Forward-Backward algorithm, and declares the presence of the putative events at times that have relatively high (e.g., above a threshold) values of the computed probability.

The rescoring phase 103 makes use of the processed speech 145 and 135 for the query speech 140 and unknown speech 120, respectively, to compute a new score for each putative event. For example, suppose the query speech 140 includes a single instance of a word or phase that is to be located in the unknown speech, and that instance of the query is represented by a series of M distributions (i.e., M frames) in processed speech 145. Suppose also that a putative event corresponding to the desired word or phase is represented by N distributions (i.e. N frames) in processed speech 135, where the length N is determined from the estimated starting time and ending time as computed by the word spotting engine 180. A rescorer 110 takes as input the series of M distributions associated with the query speech 140 and the series of N distributions associated with the event in the unknown speech 120 and produces as output a scalar score that compares the two series of distributions.

The rescorer 110 accounts for the possible different lengths (e.g., M and N) of the two inputs, as well as possible time variations within each of the inputs even if the lengths are the same, using a dynamic programming, also known as dynamic time warping (DTW), procedure. This DTW procedure makes use of a procedure for comparing pairs of probability distributions, one from a time in the query speech and one from a time in the unknown speech, that produces a scale "distance" that characterizes the dissimilarity of the distributions. The more dissimilar the distributions, the larger the computed distance.

One possible distance measure that can be used is based on the Kullback-Leibler distance between distributions. In particular, we use the notation $Pr(s_k|O_{t_1}^{(1)})$ to represents the probability of occupying a state $s_k$ of a subword model conditioned on the input $O_{t_1}^{(1)}$ at time $t_1$, where the superscript 1 is associated with the query speech and a superscript 2 is associated with the unknown speech. One option for the distance measure is $$d(t_1, t_2) = \sum_k Pr(s_k | O_{t_1}^{(1)}) \log\left(\frac{Pr(s_k | O_{t_1}^{(1)})}{Pr(s_k | O_{t_2}^{(2)})}\right)$$

A second option for the distance measure is symmetric in the sense that the roles of the query speech and the unknown speech can be reversed without affecting the distance:

$$d(t_1, t_2) =$$

$$\sum_k Pr(s_k | O_{t_1}^{(1)}) \log\left(\frac{Pr(s_k | O_{t_1}^{(1)})}{Pr(s_k | O_{t_2}^{(2)})}\right) + Pr(s_k | O_{t_2}^{(2)}) \log\left(\frac{Pr(s_k | O_{t_2}^{(2)})}{Pr(s_k | O_{t_1}^{(1)})}\right) =$$

$$\sum_k (Pr(s_k | O_{t_1}^{(1)}) - Pr(s_k | O_{t_2}^{(2)}))(\log Pr(s_k | O_{t_1}^{(1)}) - \log Pr(s_k | O_{t_2}^{(2)}))$$

For a third option for the distance measure, we use the notation $P(O_{t_1}^{(1)}|s_k)$ represent the observation probability of input $O_{t_1}^{(1)}$ in state $s_k$. This observation probability is related to the probability of occupying the state $s_k$, which can be represented using Bayes' Rule:

$$Pr(s_k | O_{t_1}^{(1)}) = \frac{P(O_{t_1}^{(1)} | s_k) Pr(s_k)}{P(O_{t_1}^{(1)})}$$

The third option for the distance measure takes the form $$d(t_1, t_2) = \Sigma_k (P(O_{t_1}^{(1)}|s_k)^\gamma - P(O_{t_2}^{(2)}|s_k)^\gamma)(\log P(O_{t_1}^{(1)}|s_k) - \log P(O_{t_2}^{(2)}|s_k))$$

The exponent γ can be chosen to be unity, or can be chosen to be a quantity less than one to reduce the effect of the range of the observation probabilities, or can be a quantity greater than one to accentuate the effect of the range of observation probabilities. This third option is related to the second option by assuming that the prior state probabilities $Pr(s_k)$ are all equal, and ignoring unconditional observation probabilities of the form $P(O_{t_j}^{(i)})$.

Figure 2A:
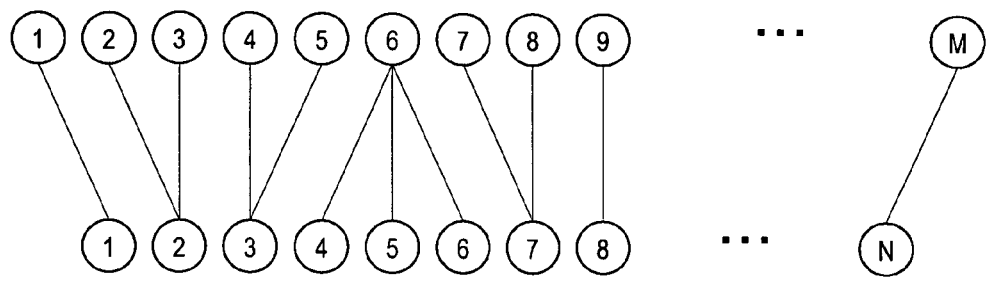
FIG. 2A is diagram that illustrates a time alignment of query speech and unknown speech.
Figure 2B:
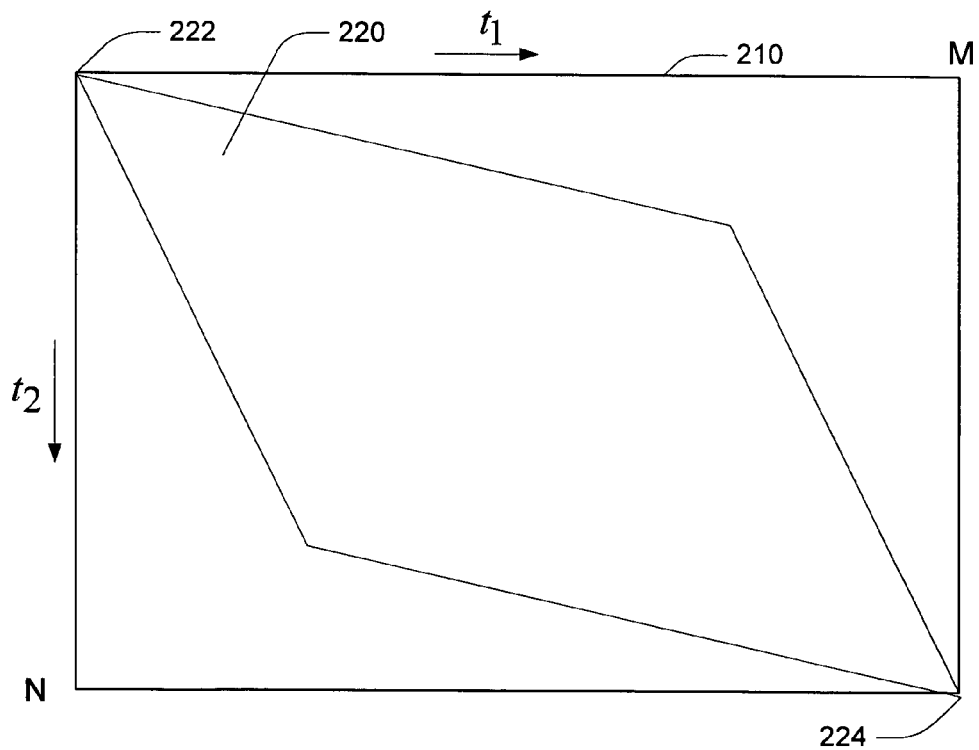
FIG. 2B is a diagram that illustrates a dynamic time warping approach for optimizing a time alignment.

Referring to FIG. 2A, the time alignment procedure associates the M times for the query speech (represented by the upper row) with the N times of the unknown speech (represented by the lower row). The first times and the last times of the signals are required to correspond to one another. Also, the time alignment is constrained in this version of the system such that at most three consecutive times in one of the signals is allowed to correspond to a single time in the other signal. Each line joining the times corresponds to one distance measure between distributions. The total distance is the sum of the individual terms. That is, D=d (1,1)+d (2,2)+d (3,2)+d (4,3)+ . . . +d(M,N) according to the alignment illustrated in FIG. 2A. The rescorer optimizes (minimizes) the alignment using a dynamic programming approach as is illustrated in FIG. 2B. An array of partial sums D(i, j) is computed such that D(1,1)=d(1,1) and $$D(i, j) = \min \begin{cases} d(i, j) + d(i, j-1) + d(i, j-2) + D(i-1, j-3), \\ d(i, j) + d(i, j-1) + D(i-1, j-2), \\ d(i, j) + D(i-1, j-1), \\ d(i, j) + d(i-1, j) + D(i-2, j-1), \\ d(i, j) + d(i-1, j) + d(i-2, j) + D(i-3, j-1) \end{cases}$$

The value D(M,N) then minimizes the sum of the individual distance terms over different time alignments. Referring to FIG. 2B, because of the constraints of the alignment, the time alignment corresponds to a path from the corresponding first frames (222) to the corresponding last frames (224), which falls within a region 220 of possible time alignments.

In alternative versions of the system, different distance measures and/or constraints on allows time alignments can be used. For example, the observations $O_t^{(i)}$ can correspond to a series of observations up to, or beginning at, time t rather a single observation occurring at time t.

In an alternative version of the approach, the word spotting engine 180 estimates only one of the starting and the ending time, but not the other, for each putative event. That is, the length of the query, M, is known, but the length of the unknown speech, N is not known. Suppose the starting time is known, then the time alignment procedure is carried out as before, except that the alignments are optimized over the unknown length N by minimizing D(M,n) over a range of allowable lengths n. In this version of the system, the alignment is optimized over possible lengths N≦2M.

In alternative versions of the system, the approach described above for computing a dissimilarity score between query speech and unknown speech can be applied to other comparisons of speech events. For example, different putative instances of a query can be compared using such an approach.

Also, in the description above, only a single instance of a query is compared with the unknown speech. In practice, multiple instances of the query speech can be used can each compared to a putative event. The multiple rescorer scores are then combined to yield a single overall score, for example, by averaging or minimizing the individual scores.

Alternative systems that implement the techniques described above can be implemented in software, in firmware, in digital electronic circuitry, or in computer hardware, or in combinations of them. The system can include a computer program product tangibly embodied in a machine-readable storage device for execution by a programmable processor, and method steps can be performed by a programmable processor executing a program of instructions to perform functions by operating on input data and generating output. The system can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

It is to be understood that the foregoing description is intended to illustrate and not to limit the scope of the invention, which is defined by the scope of the appended claims. Other embodiments are within the scope of the following claims.

What is claimed is:

1. A method comprising:
providing a set of subword unit models;
for each of two acoustic events, a first acoustic event occurring in a first acoustic signal and a second acoustic event occurring in a second acoustic signal, and for each of a series of times in each of the events, computing a probability associated with each model of the set of subword unit models; and
computing a quantity characterizing a comparison of the two acoustic events using the computed probabilities.

2. The method of claim 1 wherein the two acoustic events include a reference instance of a query and a putative instance of a query identified using a word spotting approach.

3. The method of claim 1 wherein the two acoustic events include two putative instances of a query identified using a word spotting approach.

4. The method of claim 1 wherein each of the set of subword unit models characterizes a time variation of instances of the unit.

5. The method of claim 4 wherein each of the set of subword unit models includes a Hidden Markov Model (HMM).

6. The method of claim 1 wherein computing the probability associated with each model of the set of subword unit models includes computing a probability distribution over a set of subword units corresponding with the set of subword unit models.

7. The method of claim 6 wherein computing the probability distribution over the set of subword units includes computing a probability distribution over the states of the subword units.

8. The method of claim 6 wherein computing the probability distribution over the set of subword units includes computing a probability associated with each of the set of subword units based on a time evolution of the acoustic signal over an interval including multiple subword units.

9. The method of claim 6 wherein computing the quantity characterizing the comparison of the two acoustic events includes comparing pairs of the probability distributions, one each of each pair associated with each of the two acoustic signals.

10. The method of claim 9 wherein comparing the pairs of the probability distributions includes computing a Kullback-Leibler distance between the distributions.

11. The method of claim 9 wherein computing the quantity characterizing the comparison of the two acoustic events includes time aligning the two acoustic events.

12. The method of claim 11 wherein time aligning the two acoustic events includes optimizing a time alignment based on an optimization of the quantity characterizing the comparison.

13. The method of claim 12 wherein optimizing the time alignment includes applying a dynamic programming approach.

14. Computer-readable media encoded with computer readable software comprising instructions for causing a processing system to:
   retrieve models for a set of subword units;
   for each of two acoustic events and for each of a series of times in each of the events, compute a probability associated with each of the models of the set of subword units; and
   compute a quantity characterizing a comparison of the two acoustic events, one occurring in each of the two acoustic signals, using the computed probabilities associated with each of the models.

* * * * *